UNITED STATES PATENT OFFICE.

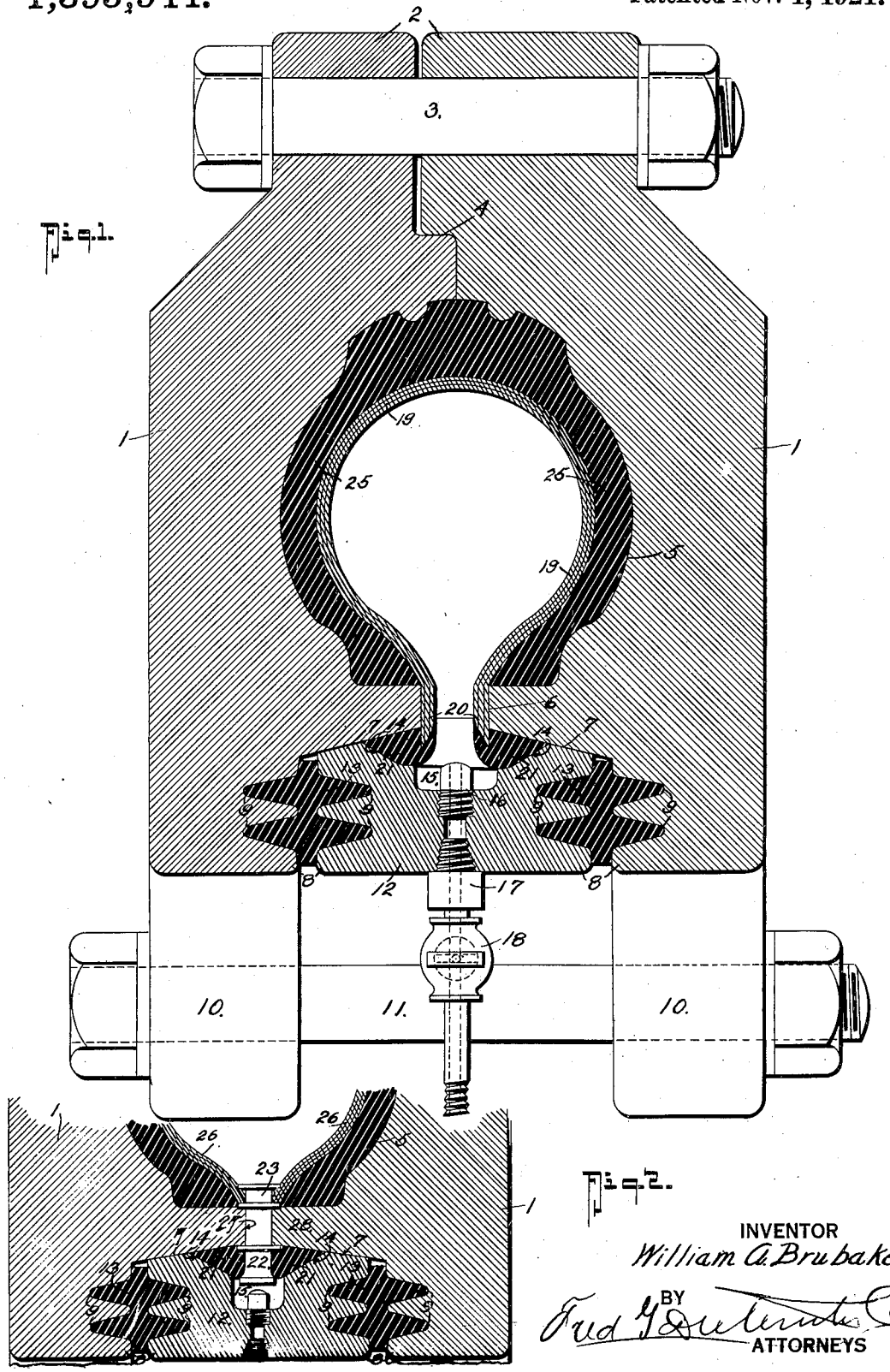

WILLIAM A. BRUBAKER, OF AKRON, OHIO.

TIRE-VULCANIZING MOLD.

1,395,944.  Specification of Letters Patent.  Patented Nov. 1, 1921.

Application filed December 8, 1920. Serial No. 429,142.

*To all whom it may concern:*

Be it known that I, WILLIAM A. BRUBAKER, a citizen of the United States, residing at Akron, in the county of Summit and State of Ohio, have invented certain new and useful Improvements in Tire-Vulcanizing Molds, of which the following is a specification.

My invention relates to the art of pneumatic tire manufacture and more specifically to the molds and forms in which the tire casings (fabric and cord) are placed during vulcanization.

At present, the general practice is to use a mold having a cavity of the desired size and form to receive the tire casing and cooperating with the air bag made up of fabric and rubber, which is placed in the casing before the casing is inclosed in the mold proper, the air bag having its inlet valve cured into the bag with no protection below the seat of the bag. This process is a treacherous one, since the bags frequently burst during vulcanization, thereby allowing the compressed air to escape with the result that the tire is not cured under compression and consequently is defective. It is therefore the prime object of my invention to provide means to overcome this defect in the present molds and process employed and to that end I provide a mold having an air-tight self-centering mold ring operating in combination with an internal flexible flap used in lieu of the air bag, there being provision made for passing the compressed air through the mold ring into the interior of the flexible flap that is located within the tire casing in the mold.

More specifically the invention resides in the provision of an internal flexible flap in combination with an air-tight self-centering mold ring, the same being gasketed by compression rubber rings.

The invention also resides in those novel features of construction, combination and arrangement of parts, all of which will be first fully described, then be specifically pointed out in the appended claims and illustrated in the accompanying drawing, in which:

Figure 1 is a cross section of a tire mold embodying my invention and showing a tire casing in the mold ready for vulcanizing.

Fig. 2 is a detail vertical section on a smaller scale of one modification of the invention.

In the drawing, in which like numerals of reference indicate like parts in all of the figures, the mold consists of the two annular side sections 1—1 which are provided with the usual lugs 2 and 10 with bolts 3 and 11 respectively for securing the two halves 1—1 of the mold together, it being understood that the mold members 1—1 have the usual stepped engagement at 4. 5 designates the molding cavity or chamber which is shaped to conform to the exterior of the tire casing to be vulcanized. The mold sections 1—1 at the base of the molding cavity are separated at 6 where they are provided with vertical walls extending down to a cavity for the reception of the annular mold ring 12, the mold ring 12 and the mold sections 1—1 having inclined opposing faces 7 and opposing vertical walls 8 with lateral indentations in the form of annular grooves 9—9 to receive the soft compression gaskets 13, as shown.

At the periphery the mold ring 12 is provided with a central annular groove 15 and with inclined wall faces 14, the latter cooperating with the inclined wall 7 of the mold sections 1—1 adjacent to the passage 6 in receiving the wedge shaped soft rubber cushions 21 that are molded onto the edges 20 of the flexible flap 19 for a purpose presently explained. 16 is a nipple tapped into a bore in the ring 12 with which bore the air-tight pipe plug 17 communicates, the air being supplied through an air cock 18 into the annular chamber 15 of the ring 12, which chamber communicates through the passage between the edges 20 of the flap 19 with the interior of the flap 19, the said flap being held within the tire casing 25, as shown.

In Fig. 2, I have illustrated how my improved mold may be used with the present construction of tire bag in place of the flap 19, and by reference to Fig. 2, it will be observed that the tire bag 26 is provided with the air inlet valve 23 having the stem 22 which projects down through an aperture 27 in the base flange portion 28 of the mold sections 1—1, the flange portions 28 in this form of the invention being extended to abut one another instead of leaving an annular space, as in the form shown in Fig. 1, the flanges 27 being bored to form a hole for the passage of the stem 22 of the valve 23, the stem 22 projecting through the soft rubber cushion or gasket 21 which functions for the same purpose as the gaskets 21 in Fig. 1.

Referring especially to the form shown in Fig. 1, it will be noticed that when the parts are assembled as indicated and air is admitted through the cock 18 into the chamber 15 the air pressure established tends to force the soft rubber cushions 21 tighter into their wedge shaped seat, thereby effectually sealing the contact between the rings 12 and the mold member 1—1 along the inclined surface 7 and preventing the escape of air under normal conditions. The flexible flap 19, in the form shown in Fig. 1, is not an air bag. Its agency is simply to keep the air away from the interior of the uncured tire carcass.

In the form shown in Fig. 2, however, the air bag 26 performs its usual function. Any tendency of the air to escape in either the form shown in Fig. 1 or that shown in Fig. 2 past the soft rubber cushions 21 causes the escaping air to apply sufficient pressure to the soft rubber compression gaskets to seat them more firmly and thus effectually seal the mold against escape of air.

In the drawings I have illustrated preferred embodiments of the invention. While I prefer to use either the ordinary air bag 26 or (preferably) the flexible flap 19, yet there may be times when the use of an air bag or flexible flap may be dispensed with and the air pressure applied directly to the interior of the tire carcass through the ring 12, and while I have illustrated the preferred embodiments of the invention, I do not wish it understood that I am limited to the specific details of construction shown and described, as the same may be changed to suit special conditions met with in practice without departing from the spirit of the invention or the scope of the appended claims.

What I claim is:

1. In tire vulcanizing molds the combination with the side mold plates and the means for holding the same together; a base ring, means for leading compressed air through the base ring into the mold cavity, and means assisted by the pressure of the air within the mold for sealing the ring and mold plates against escape of air.

2. In tire vulcanizing molds, a pair of side mold plates, means securing the same together, said plates being spaced apart at the base of the mold cavity and recessed, a mold ring held in the recess and having provision for the passage of compressed air through the same into the mold via the space at the base of the mold cavity, said ring and said mold plates having opposing walls providing wedge shaped recesses and sealing cushions held in said recesses to restrain escape of air.

3. In tire vulcanizing molds, a pair of side mold plates, means securing the same together, said plates being spaced apart at the base of the mold cavity and recessed, a mold ring held in the recess and having provision for the passage of compressed air through the same into the mold via the space at the base of the mold cavity, said ring and said mold plates having opposing walls adjacent to the base of the mold cavity, sealing cushions held between said walls, said ring and said mold plates also having opposing side walls which are provided with grooves, and compression gaskets held in the latter grooves.

4. In tire vulcanizing molds the combination with the side mold plates and the means for holding the same together, a base ring, means for leading compressed air through the base ring into the mold cavity, means assisted by the pressure of the air within the mold for sealing the ring and mold plates against escape of air, and a flexible flap adapted to be held within the tire carcass in the mold chamber and coöperate with said base ring to receive the compressed air passing through the ring into the mold.

5. In tire vulcanizing molds, a pair of side mold plates, means securing the same together, said plates being spaced apart at the base of the mold cavity and recessed, a mold ring held in the recess and having provision for the passage of compressed air through the same into the mold via the space at the base of the mold cavity, said ring and said mold plates having opposing walls providing wedge shaped recesses, sealing cushions held in said recesses to restrain escape of air, and a flexible flap adapted to be held within the tire carcass in the mold chamber and coöperate with said base ring to receive the compressed air passing through the ring into the mold.

6. In tire vulcanizing molds, a pair of side mold plates, means securing the same together, said plates being spaced apart at the base of the mold cavity and recessed, a mold ring held in the recess and having provision for the passage of compressed air through the same into the mold via the space at the base of the mold cavity, said ring and said mold plates having opposing walls providing wedge shaped recesses and sealing cushions held in said recesses to restrain escape of air, and means insertible in the tire carcass to receive the compressed air introduced into the mold via the base ring.

7. In tire vulcanizing molds, a pair of side mold plates, means securing the same together, said plates being spaced apart at the base of the mold cavity and recessed, a mold ring held in the recess and having provision for the passage of compressed air through the same into the mold via the space at the base of the mold cavity, said ring and said mold plates having opposing walls adjacent to the base of the mold cavity, sealing cushions held between said walls, said ring and said mold plates also having opposing side walls which are provided with grooves, compression gaskets held in the latter grooves, and a flexible flap adapted to be held within the tire carcass in the mold chamber and coöperate with said base rings to receive the compressed air passing through the ring into the mold.

WILLIAM A. BRUBAKER.